United States Patent [19]

Nguyen et al.

[11] Patent Number: 5,017,397

[45] Date of Patent: May 21, 1991

[54] PROCESS FOR EXTRACTING ANTIOXIDANTS FROM LABIATAE HERBS

[76] Inventors: Uy Nguyen, 4635 - 37 Avenue, Edmonton, Alberta, Canada, T6L 3V2; Grigory Frakman, 5504 - 179 Street, Edmonton, Alberta, Canada, T6M 1X1; David A. Evans, 141 Tudor Lane, Edmonton, Alberta, Canada, T6J 3T5

[21] Appl. No.: 514,311

[22] Filed: Apr. 25, 1990

[51] Int. Cl.$^5$ .............................................. A23L 1/28
[52] U.S. Cl. ..................................... 426/542; 426/489
[58] Field of Search .......................... 426/542, 386, 489

[56] References Cited

U.S. PATENT DOCUMENTS

| | | | |
|---|---|---|---|
| 4,022,921 | 5/1977 | Sakakibara | 426/542 |
| 4,363,823 | 12/1982 | Kimura | 426/542 |
| 4,632,837 | 12/1986 | Schutz | 426/489 |
| 4,640,841 | 2/1987 | Forster | 426/489 |
| 4,806,379 | 2/1989 | Goers | 426/489 |

FOREIGN PATENT DOCUMENTS 54-7861  4/1979  Japan ................... 426/542

*Primary Examiner*—Carolyn Paden
*Attorney, Agent, or Firm*—Ridout & Maybee

[57] ABSTRACT

Natural plant extracts exhibiting improved antioxidant properties are prepared from ground leaves of the Labiatae family of domestic herbs by application of a supercritical fluid extraction and fractionation process with carbon dioxide under specific operating conditions. The extracts have greater antioxidant activity than natural antioxidants extracted using other processes such as solvent extraction or molecular distillation. The extracts of the invention are oil soluble, colorless and flavorless when used at the optimum levels and provide more cost-effective protection from oxidation than existing natural antioxidants. They are effectve in animal and vegetable fats and oils, processed meats and fish, processed foods and beverages, food colorants, cosmetics and health-care products at usage reates of 0.01–0.05% of fat/oil. Starting materials include Rosmarinus spp. or Salvia spp. or Thymis spp. or Origanum spp. of the common domestic herbs rosemary, sage, thyme and oregano or residues of same after removal of volatile aromatic and flavor components by means of, steam distillation, subcritical carbon dioxide or supercritical carbon dioxide at pressures of less than 350 bar.

8 Claims, 4 Drawing Sheets

PRIME STEAM LARD
MEANS OF 2 REPLICATES
RELATIVE ANTIOXIDANT STRENGTH
AGAINST COMMERCIAL STANDARDS

MEANS OF 4 REPLICATES

COOKED CHICKEN STORAGE TEST
MECHANICALLY DEBONED CHICKEN

MEANS OF 3 REPLICATES

PAPRIKA OLEORESIN
COLOUR VALUE TEST

PROCESS FOR EXTRACTING ANTIOXIDANTS FROM LABIATAE HERBS

This invention relates to the production of natural herb extracts exhibiting enhanced antioxidant activity.

Animal and vegetable fats and oils (together with food, cosmetic and health-care products containing them) are subject to oxidative rancidity on storage. Such oxidative deterioration is accelerated on cooking and leads to objectionable stale, rancid or "warmed-over" flavour development. The oxidative process, once initiated, proceeds at a rate proportional to the level of oxidative by-products present, that is, it proceeds exponentially. The same processes can occur with natural food and cosmetic colourants such as the carotenoid pigments, leading to objectionable aroma and flavour and loss of colour intensity. As flavour, odour and colour are the principal factors by which food quality is judged, antioxidants suitable for incorporation into food products are valued for their capacity to reduce the destructive oxidative process to provide a longer shelflife.

A number of synthetic chemical compounds are used as antioxidants in the food and cosmetic industries. These compounds primarily consist of a group of phenolic derivatives which include BHA (butylated hydroxyanisole), BHT (butylated hydroxytoluene), propyl gallate and TBHQ (tertiary butylhydroquinone). As these antioxidants are produced by synthetic chemical processes, their inclusion in food products is severely limited by regulation in regard to both level of use and food product application. In many applications they are completely banned. Other problems with this class of compounds include heat sensitivity, discolouration and susceptibility to loss by steam distillation. More recently, researchers in Japan have found links between BHA and cancer in laboratory experiments with rats.

One of the most important consumer trends in the food industry today is the demand for "all natural" food products that are free of chemical additives. This demand has focused attention on certain natural antioxidant materials obtained from plant sources. Most work in this area has concentrated on the antioxidant activity of natural herbs and spices such as cloves, ginger, mace, nutmeg and the Labiatae herbs rosemary, sage, thyme and oregano. Chipault, et al, Food Res. 17:46 (1952), and Food Technol. 10(5):209 (1956) has investigated the antioxidant properties of many ground herbs and their ethanol extracts and has shown that rosemary and sage have the highest antioxidant activity. Inatani, et al, Agric. Biol. Chem. 46:1661 (1982); Wu, et al, JAOCS 59:339 (1982); Houlihan, et al, JAOCS 61:1036 (1984); and Houlihan and Ho, in "Flavour Chemistry of Fats and Oils" (1985) have isolated and identified four of the active antioxidant compounds from rosemary as rosmanol, carnosol, rosmaridiphenol and rosmariquinone; three of which are phenolic di- and triterpenes. These naturally occurring compounds have been shown to have antioxidant activity equivalent to BHA and BHT.

Various processes for obtaining antioxidant extracts from rosemary, for example, have been disclosed. The major problems to overcome are to obtain the extract with sufficient antioxidant activity to allow usage at levels equivalent to the synthetic antioxidants (0.01–0.05% of fat/oil) and to remove flavour, odour and colour components which may be detectable in the treated food product at the usage levels required. A review of the prior art shows that generally the following methods are taught to obtain antioxidant extracts from the Labiatae family of herbs: solvent extraction (polar and non-polar), aqueous alkaline extraction, extraction with vegetable oils or mono- and diglycerides or both, steam distillation and molecular distillation. These processes suffer from a number of disadvantages. The solvents used are not effectively selective for the active antioxidant compounds, and consequently, the resulting extracts are not as strong as the synthetic chemical antioxidants. The solvents used include compounds such as hexane, acetone and methyl chloride which can leave unwanted residues in the food products and which in some instances are prohibited from use in food by regulation. Processes using molecular distillation to concentrate the active fraction and to remove colour, aroma and flavour components result in a different type of dilution effect due to the presence of the distillation carrier which has a detrimental impact on the solubility of the extract in fats and oils.

The application of supercritical carbon dioxide fluid to the extraction and fractionation of lipophilic materials has been reviewed by Stahl, et al, in "Dense Gases For Extraction and Refining" (1987). Tateo and Fellin, Perfumer and Flavorist, 13:48 (1988) describe a procedure in which ground rosemary leaves are subjected to extraction with supercritical carbon dioxide at a pressure of 300 bar and 35° C. to remove the rosemary oleoresin containing the essential oil. The ground leaf residue remaining after extraction is then re-extracted with ethyl alcohol, filtered, evaporated and dried to obtain an antioxidant fraction. Antioxidant activity of the fraction (peroxide value (meq/kg) of prime steam lard at 100° C. for 18 hours) was equivalent to a similar ethanol extract of ground leaf residue remaining after steam distillation to remove essential oil, equivalent to a commercial antioxidant extract (Rosemary Extract AR) produced by more complex solvent technology, but less than BHA used at the same level (0.03% fat/oil). Pfizer Corporation (ca. 1988) produce a/commercial product (Rosemary Deodorised) in which the oleoresin fraction obtained by extracting rosemary with supercritical carbon dioxide is then subjected to molecular distillation to improve colour and flavour. The resulting product contains about 80% capric and caprylic triglyceride (the distillation carrier), has poor oil solubility and relatively weak antioxidant activity.

A summary of the currently commercially available natural food antioxidants and their recommended usage rates for equivalence to BHA/BHT (1:1) at 0.02% fat/oil are as follows:

| | |
|---|---|
| Rosemary Deodorised (CAL/Pfizer) | .10% |
| Spice Extract AR (Nestle) | .05% |
| Flavor Guard I (OM Ingredients Co.) | .02–.06% |
| Herbalox Type "O" (Kalsec Inc.) | .05–.10% |

The current international standard of commerce is Herbalox Seasoning Type "O" and derived modifications, produced under U.S. Pat. Nos. 3,950,266; 4,283,429; 4,285,981; 4,315,947; 4,343,823 and 4,877,635. At the higher usage rates this product provides a pronounced rosemary flavour.

The present invention relates to the production of improved natural antioxidant extracts from the Labiatae family of domestic herbs by means of supercritical extraction and fractionation with carbon dioxide under specific operating conditions. A novel and unexpected aspect of the invention is that the antioxidant extracts so obtained exhibit greater antioxidant activity than extracts from the same raw materials produced by prior art processes. The optimum usage level for extracts from rosemary and sage is 0.02% of fat/oil, which produces antioxidant protection at least equal to the synthetic antioxidants BHA/BHT (1:1). The extracts exhibit satisfactory fat/oil solubility, contribute little colour, aroma and flavour when used at the recommended levels, and because of their low usage level, are more cost effective than currently available products produced by prior processes. The extracts are obtained without the use of organic solvents. When practiced in the preferred form, the process simultaneously provides a valuable essential oil by-product thereby enhancing the economics of the process.

BRIEF SUMMARY OF THE INVENTION

According to one aspect of the invention, the dried leaves of the Labiatae family of domestic herbs (Rosmarinus spp. or Salvia spp. or Oreganum spp. or Thymus spp.) are subjected to the following steps:

1. The leaves are ground to a fineness of less than 20 mesh, preferably 75% less than 45 mesh.
2. The ground leaves are then extracted with supercritical fluid carbon dioxide under conditions of:

| | |
|---|---|
| Pressure: | 350 to 1000 bar (preferably 500-1000 bar) |
| Temperature: | 31 to 120° C. (preferably 90-110° C.) |
| Fluid Density: | .60 to 1.00 kg/l (preferably .80-1.00 kg/l) |

3. Approximately 70% to 75% of the extract is precipitated from the supercritical fluid (antioxidant fraction) under conditions of:

| | |
|---|---|
| Pressure: | 100 to 150 bar (preferably 110-125 bar) |
| Temperature: | 40 to 100° C. (preferably 75-85° C.) |
| Fluid Density: | .20 to .40 kg/l (preferably .25-.35 kg/l) |

4. The remaining extract is precipitated under non-supercritical conditions (essential oil fraction) of:

| | |
|---|---|
| Pressure: | 20 to 50 bar (preferably 30-35 bar) |
| Temperature: | −10 to 25° C. (preferably 5-20° C.) |
| Gas Density: | <.15 kg/l (preferably .05-.10 kg/l) |

The process may be conveniently carried out in commercially available supercritical fluid extraction apparatus with at least one extractor vessel and at least two separation vessels, such as, for example, those manufactured by Udhe GMBH and Nova Werke AG; provided the extractor is engineered to operate at a pressure of 350 bar or greater.

DESCRIPTION OF THE BEST MODE

Figure 1:
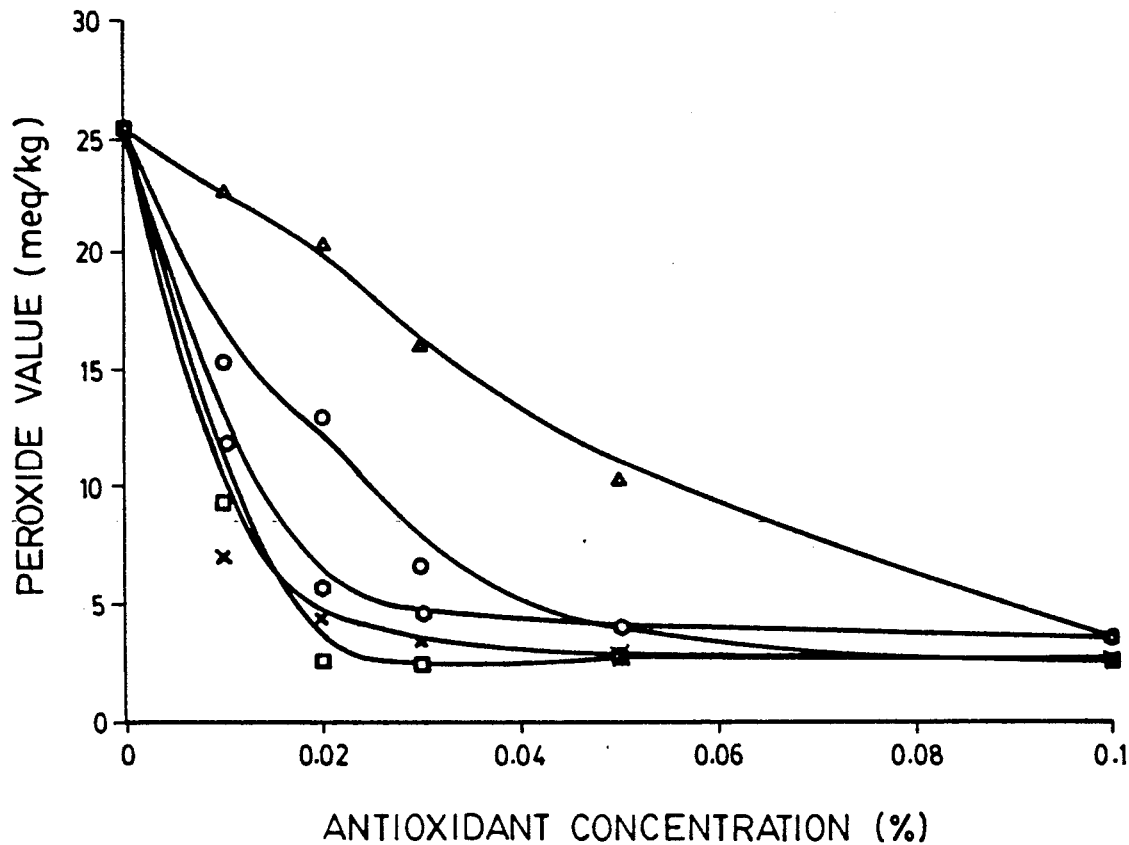
FIG. 1 is a graph showing the optimum concentration of antioxidant obtained by the invention vs. commercially available antioxidants when tested in lard.

The invention is a process for extracting antioxidant substances from herbs under conditions which preserve the antioxidant power of the substances without contaminating the substances with potentially harmful solvents, distillation carriers or other additives. The antioxidants obtained by the inventive process are readily soluble in fats and oils at the 0.01-0.05% levels needed to impart an acceptable antioxidizing effect, and the process yields a substance which adds no flavour, odour or colour to the treated fat or oil.

Commercially useful antioxidant extracts have been found to be obtainable from the Labiatae family of domestic herbs. These herbs include rosemary (Rosmarinus spp.), sage (Salvia spp.), oregano (Oreganum spp.), and thyme (Thymus spp.). In accordance with the invention, dried leaves of Labiatae herbs are ground and extracted under high pressure of at least about 350 bar with supercritical fluid carbon dioxide at a temperature of from 31° C. to 120° C. The extraction preferably proceeds at a rate so that the optimal amount of antioxidant is extracted within about one hour.

Each gas has a critical pressure ($P_c$) and a critical temperature ($T_c$) above each of which a supercritical fluid state is attained. Solvent properties of such supercritical fluids have been found to be a complex function of the fluid density which in turn is a complex function of temperature and pressure. Thus, by varying the temperature and pressure of a supercritical fluid, extractions and precipitations can be carried out. Carbon dioxide has proven to be a particularly advantageous gas to use in supercritical fluid extractions because it possesses good solvent properties, has low chemical reactivity, low toxicity, is not flammable, is inexpensive and may be readily recycled, and leaves no undesirable residues in the precipitates. Carbon dioxide has a $P_c$ of 73.8 bar, a $T_c$ of 31.1° C. and a density at the $P_c$ and $T_c$ of 0.468 g/cc.

The supercritical fluid carbon dioxide containing extracted antioxidants and other substances is subjected to a first precipitation step in which the antioxidant substances are collected. The first precipitation occurs under conditions of reduced pressure as compared to the extraction step, e.g. 100-150 bar, but maintaining the carbon dioxide in its supercritical fluid state.

Additional commercially valuable substances, such as essential oils, are collected in a second precipitation step wherein the pressure and temperature of the carbon dioxide are reduced to non-supercritical conditions. The gaseous carbon dioxide from the second precipitation is preferably recycled to the extraction step of the process of the invention.

Preferably, the process of the invention is carried out in a commercially available pressure extraction apparatus. The basic technology of supercritical fluid extraction is well known. In fact, the teachings of this art indicate that cosolvents or entrainers such as propane or ethanol are usually needed to achieve the desired extraction efficiency, supercritical carbon dioxide not being a good enough solvent in its pure state.

While the preferred starting material is ground dried Labiatae leaf, the raw material may comprise ground Labiatae leaf residue from prior extraction of the essential oil, by steam distillation, subcritical carbon dioxide or supercritical carbon dioxide under conditions of pressure of less than 350 bar. The yield and rate of extraction of the antioxidant with supercritical fluid carbon dioxide increases with higher extraction pressure from 350 bar up to 1000 bar without reducing the antioxidant activity of the extract. Yields and rates of extraction at or below 350 bar are reduced to the point where the process is not economic. The preferred range of extraction pressure is 500–1000 bar which results in optimum yields and rates of extraction.

The yield and rate of extraction of the antioxidant according to the invention increases with a higher extraction temperature in the range of from 31° C. up to 120° C. without reducing antioxidant activity. At extraction temperatures much above 110° C., however, heat damage can occur to both the extracted components and the extracted residue. The preferred extraction temperature range is 90°–110° C. which has been found to give optimum yields and rates of extraction.

It is preferred that the supercritical fluid used in the process of the invention is carbon dioxide without the addition of cosolvents such as ethanol or propane. Such cosolvents increase the yields of the antioxidant extracts but do so non-selectively so that the resulting antioxidant activity of the extracts is reduced when compared with antioxidant extracted with pure carbon dioxide.

It has been the surprising result of this invention that the use of pure carbon dioxide under the conditions of this process results in the extraction of antioxidant substances having antioxidant activity comparable to the synthetic antioxidants BHA and BHT. Since pure carbon dioxide is used in the process, the resulting antioxidant extract is free of undesirable contaminants.

Additionally, precipitation conditions for the antioxidant provide a substantial separation of antioxidant components from essential oils. Thus, the antioxidants obtained by the invention can be added to foods or cosmetics without imparting unwanted flavours or odours to them.

The antioxidant extracts obtained pursuant to the invention, which exhibit a resinous character at ambient temperature, may be ground to a fine powder at temperatures of −18° C. or less and either dissolved or dispersed in food-grade animal or vegetable oils and fats for incorporation into food, cosmetic and health-care products. Alternatively, such powder can be incorporated directly into the products.

A non-oil solution of the antioxidant extracts obtained by the process of the invention can be prepared by dissolving the extract in ethanol, e.g. 95% ethyl alcohol, and filtering off any insoluble residue. This ethanol tincture may be preferred over an oil or fat carrier for some applications.

The antioxidant extracts obtained from Rosmarinus officinalis and Salvia officinalis by the process of the invention exhibit antioxidant activity at least equal to the synthetic antioxidants BHA/BHT (1:1) when used at 0.02% of fat/oil and are superior in antioxidative strength to other commercially available natural antioxidants.

The invention will be more fully understood by reference to the following examples. However, these examples are merely intended to illustrate embodiments of the invention and are not to be construed as limiting the scope of the invention.

EXAMPLE 1

The raw materials used in the examples comprised commercial samples of the following domestic herbs:

| Rosemary (Spanish) | R. officinalis |
| Sage (Albanian) | S. officinalis |
| Sage (Greek) | S. triloba |
| Oregano (Greek) | O. vulgare |
| Thyme (French) | T. vulgaris |

These materials were purchased through normal spice-trade channels in the "whole leaf" form, in quantities of 25kg to 100kg units. Prior to extraction the leaves were passed once through a hammer mill (Fitzmill Model D-6) with a #0030 screen. Liquid nitrogen was injected into the grinding chamber during grinding at a rate sufficient to maintain the temperature of the emerging ground leaves at less than −20° C. The ground leaves emerged from the mill in the form of a very fine powder with the particle size distribution characteristics given in Table 1.

TABLE 1

SIEVE ANALYSES OF GROUND MATERIALS
% RETAINED (MEANS OF 3 SAMPLES)

| MESH | R off. | S off. | S tri. | O vul. | T vul. |
| --- | --- | --- | --- | --- | --- |
| 20 | .12 | 1.88 | 2.01 | .22 | .55 |
| 30 | 1.54 | 1.62 | 3.55 | .40 | .25 |
| 45 | 11.12 | 15.45 | 20.04 | 9.14 | 8.94 |
| 50 | 22.23 | 22.03 | 30.53 | 12.61 | 8.88 |
| 60 | 13.72 | 28.67 | 32.95 | 16.62 | 16.19 |
| >60 | 51.27 | 30.35 | 10.92 | 60.95 | 65.37 |

The figures in Table 1 indicate that the grinding procedure is satisfactory for producing a fine powder with approximately 75% of the particles capable of passing through a 45 mesh screen thereby enhancing the efficiency of extraction with supercritical fluid solvent. Samples of the ground leaf material were then subjected to laboratory analysis for total ether extract (AOCS Official Method Bc 3-49), essential oil (ASTA Official Method 5.0) and moisture (AOCS Official Method F 1a-44). Results of the analyses are shown in Table 2. The figures indicate that all raw materials have compositional characteristics in line with average quality commercial herbs. In particular the essential oil levels show that grinding under liquid nitrogen has resulted in no significant loss of volatiles by heat generated during the grinding process.

TABLE 2

COMPOSITION OF RAW MATERIALS
(MEANS OF 3 SAMPLES)

| HERB | MOISTURE (%) | ETHER EXTRACT (%) | ESSENTIAL OIL (ml/100 gm) |
| --- | --- | --- | --- |
| R. officinalis | 7.2 | 17.4 | 1.7 |
| S. officinalis | 8.0 | 12.7 | 1.3 |
| S. triloba | 8.0 | 15.4 | 2.3 |
| O. vulgare | 4.3 | 8.0 | 2.9 |
| T. vulgaris | 6.6 | 7.1 | .7 |

EXAMPLE 2

Approximately 1.25 kg samples of each of the five raw materials ground according to the procedure of Example 1 were extracted in a pilot supercritical apparatus manufactured by Udhe GMBH. This apparatus comprises two extractor vessels and one separation vessel each of 4 litres capacity with the option to configure the system as one extractor and two separators. The samples were first extracted at 300–350 bar and 35°–40° C. according to Tateo, et al, Perfumer and Flavorist, 13:48 (1988) with a carbon dioxide flow rate of 45 kg/hr and for sufficient time (usually 30-60 min.) to give a $CO_2$:feedstock ratio of 24:1 (rosemary and sage) or 12:1 (oregano and thyme). The extracts were precipitated and recovered in the separator vessel at 30 bar and 5° C. as a series of green-brown liquid extracts with essential oil contents in excess of 50ml/100gm of extract. These extracts are the "300 bar extracts". The ground herb residues remaining after 300 bar extraction were then re-extracted at 500 bar and 40° C. with a $CO_2$ flow rate of 45 kg/hr for sufficient time (30-60 min.) to give a $CO_2$:feedstock ratio of 32:1 (rosemary and sage) or 12:1 (oregano and thyme). The extracts were precipitated and recovered in the separator vessel at 50 bar and 35° C. as a series of light greenish brown solid to semi-solid resinous materials which melted to viscous liquids at 80° C. These extracts are the "500 bar extracts". Samples of the residues remaining after both 300 bar and 500 bar extractions were then extracted in the laboratory (Soxhlet) with 95% ethyl alcohol. Antioxidant activities of all extracts were then measured by means of an accelerated storage test in which the extracts were dissolved in prime steam lard at the level of 0.03% and incubated in sealed bottles in a laboratory oven at 100° C. for 18 hours. Two control samples were also incubated consisting of lard with no antioxidant (Control) and lard with 0.03% BHA/BHT (1:1). At the completion of the incubation period the peroxide values (meq/kg) of the samples were measured (AOAC Methods 28.025/28.026). Results of the antioxidant activity tests are shown in Table 3.

TABLE 3

PEROXIDE VALUES (meq/kg) FOR PRIME STEAM LARD AT 100° C. FOR 18 HOURS (MEANS OF 3 REPLICATES)

| HERB | EE 300 RES. | 500 EXT. | EE 500 RES. |
|---|---|---|---|
| R. officinalis | 4.9 | 1.4 | 6.4 |
| S officinalis | 3.8 | 1.6 | 8.3 |
| S. triloba | 8.7 | 2.3 | 7.1 |
| O. vulgare | 11.1 | 3.6 | 9.5 |
| T. vulgaris | 6.5 | 2.8 | 5.9 |
| CONTROLS | | | |

Lard pretreatment = .5
Control lard = 27.2
BHA/BHT (1:1) = 1.8

The ethanol extracts of the 300 bar residues (EE 300 RES.) have moderately good antioxidant properties as shown by Tateo, et al, (1988) for rosemary but they do not match the strength of the synthetic antioxidants BHA/BHT when used at the same level. The superiority of the supercritical extracts at 500 bar (500 EXT.) over the ethanol extracts is a novel and unexpected result. The 500 bar extracts exhibit antioxidant activity at least equal to BHA/BHT (1:1) in the case of both R. officinalis and S. officinalis and slightly less in the cases of S. triloba, O. vulgare and T. vulgaris. Ethanol extracts of the 500 bar residues (EE 500 RES.) show reduced antioxidant activity indicating that the 500 bar extracts removed the majority of the active antioxidant compounds. The highest levels of antioxidant activity are unique to the extracts obtained with supercritical carbon dioxide between 350 and 500 bar. The relative order of antioxidant strength for the 500 bar extracts is rosemary > sage > thyme > oregano which reflects the known relative antioxidant strengths of the ground herbs (Chipault et al 1956).

EXAMPLE 3

Approximately 1.25 kg samples of each of the five raw materials were ground according to the procedure of Example 1 and extracted in the apparatus described in Example 2 with the one extractor/two separators configuration. Pressure and temperature parameters for the three vessels are shown in Table 4.

TABLE 4

EXTRACTION AND FRACTIONATION PARAMETERS

| HERB | EXTRACTOR (bar/°C.) | 1st SEPARATOR (bar/°C.) | 2nd SEPARATOR (bar/°C.) |
|---|---|---|---|
| R. officinalis | 500/100 | 115/85 | 33/17 |
| S. officinalis | 500/95 | 120/80 | 35/15 |
| S. triloba | 500/95 | 115/75 | 35/10 |
| O. vulgare | 500/95 | 120/75 | 33/10 |
| T. vulgaris | 500/95 | 120/80 | 35/15 |

The carbon dioxide flow rate was 45 kg/hr and the $CO_2$:feedstock ratios were 32:1 (rosemary and sage) and 12:1 (oregano and thyme). The antioxidant extracts were recovered from the first separator vessel as light greenish brown solid to semi-solid resinous materials. The essential oil extracts were recovered from the second separator as a mixture of greenish brown aromatic liquid oils and water. These mixtures were then centrifuged to separate the oils from the water following which the oils were decanted off. Essential oil contents of the fractions were measured by the method of Example 1 and activity of the antioxidant extracts at 0.03% usage by the method of Example 2. Results are shown in Table 5 and demonstrate the capacity of the preferred process to simultaneously produce both high quality essential oils with volatile oil contents in excess of 80 ml/100gm and natural antioxidant extracts comparable in antioxidant activity to the synthetic antioxidants BHA and BHT but with less than 5ml/100gm of volatile aromatic and flavour components. The preferred operating parameters given Table 4 have resulted in economically viable yields of both products.

TABLE 5

COMPOSITION AND ACTIVITIES

| | ESSENTIAL OIL FRACTION | | ANTIOXIDANT FRACTION | | |
|---|---|---|---|---|---|
| HERB | YIELD (%) | ESSENTIAL OIL (ml/100 gm) | YIELD (%) | ESSENTIAL OIL (ml/100 gm) | P.V. (meq/kg) |
| R. officinalis | 1.6 | 94.3 | 5.2 | 2.8 | 1.5 |
| S. officinalis | 1.7 | 88.0 | 5.7 | 4.1 | 1.5 |
| S. triloba | 2.2 | 90.2 | 6.0 | 2.3 | 2.1 |
| O. vulgare | 2.5 | 94.4 | 3.2 | 4.7 | 3.8 |
| T. vulgaris | .7 | 81.6 | 2.0 | 4.2 | 1.9 |
| CONTROLS | | | | | |

Lard pretreatment = .5
Control lard = 33.7
BHA/BHT (1:1) = 1.0

EXAMPLE 4

Five grams each of rosemary and sage antioxidant extracts prepared by the method of Example 3 were dissolved in 90 grams of refined Canola oil which had been heated to 85° C. to facilitate solubility. The extracts dissolved in the oil without difficulty to give a 10% Labiatae antioxidant oil solution ("Labex"). The Labex solution was then tested for comparative antioxidant activity with three commercially available natural antioxidants (Herbalox Type "O", Spice Extract AR, Flavor Guard I) and the synthetic antioxidant mixture BHA/BHT (1:1). The test method was that of Example 2 at usage levels of 0.01, 0.02, 0.03 and 0.05% where the usage level was based on active ingredient (Labex, BHA/BHT (1:1)) or "as is" (commercial antioxidants). The results are shown in FIG. 1. It is evident from FIG. 1 that the 1:1 mixture of rosemary and sage extracts showed optimum activity at the 0.02% usage rate (0.20% of 10% oil solution) which was equivalent to BHA/BHT (1:1) and superior to the commercial antioxidants at all levels.

EXAMPLE 5

Figure 2:
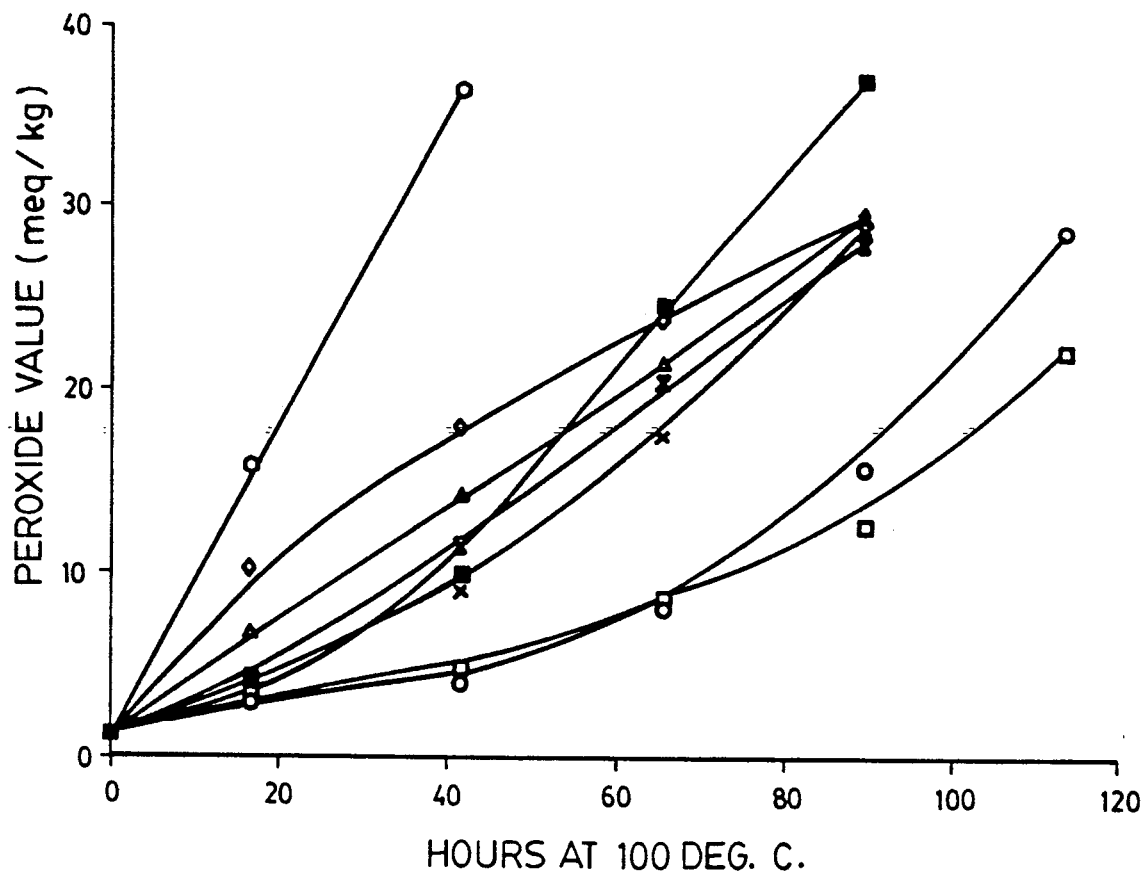
FIG. 2 shows the relative antioxidant strengths of extracts obtained by the invention vs. commercially available antioxidants when tested in lard.

The Labex solution prepared in Example 4 was tested for relative antioxidant strength in comparison with the natural antioxidant standard of commerce (Herbalox Type "O") and the synthetic antioxidant standard of commerce (Tenox 4) by a modification of the procedure in Example 2. The oven treatment period was extended until all samples had reached a peroxide value of 20 meq/kg which is accepted as the organoleptic detectable rancidity level for lard. Peroxide values were measured once each day until the 20 meq/kg level had been exceeded. Usage levels were 0.05% (Tenox 4), 0.03, 0.05 and 0.10% (Herbalox) and 0.30, 0.50 and 1.00% (Labex, equivalent to 0.03, 0.05 and 0.10% active ingredient). Results are shown in FIG. 2 which clearly demonstrates the superiority of the rosemary/sage natural antioxidant extracts. The Labex oil solution at 0.30% (0.03% active ingredient) produces a longer incubation time to a peroxide value of 20 meq/kg in comparison with Herbalox at 0.03%. Labex at 0.50% and 1.00% (0.05 and 0.10% active ingredient) result in significantly longer protection than both Herbalox at 0.05 and 0.10% and Tenox 4 at 0.05%.

EXAMPLE 6

Three 50 lb batches beef/pork sausage were manufactured in a commercial facility. The binder additives for each batch were formulated to contain:

| | |
|---|---|
| Batch 1: Control | Standard commercial binder (no antioxidant). |
| Batch 2: Erythorbate | Standard binder including sodium erythorbate at .03% of finished product. |
| Batch 3: Treatment | Standard binder including the rosemary antioxidant produced by the process of Example 2 at .03% of finished product. |

The rosemary antioxidant extract was easily plated onto the salt content of the binder and blended with the other binder constituents. The sausages were stored at 4° C. for 7 days following which fat from sample sausages was extracted with dichloromethane and subjected to accelerated storage at 100° C. for 18 hours in accordance with the method of Example 2. The resulting peroxide values are shown in Table 6 which clearly demonstrates the capacity of the antioxidant extract to incorporate into a food product and remain active during storage.

TABLE 6

| ANTIOXIDANT IN BEEF/PORK SAUSAGE | |
|---|---|
| BATCH | PEROXIDE VALUE (meq/kg) |
| Control | 33.9 |
| Erythorbate | 17.0 |
| Treatment | 1.4 |

EXAMpLE 7

Rosemary antioxidant extract produced by the method of Example 2 was mixed into commercial refined Canola vegetable oil and commercial margarine (Canbra "West" brands) at a temperature of 85° C. at levels of 0.03 and 0.10%. Control samples containing no antioxidant and samples containing BHA/BHT (1:1) at 0.03 and 0.10% were also prepared. The samples were incubated at 100° C. for 18 hours in accordance with the method of Example 2. Resulting peroxide values are shown in Table 7 which demonstrates that the rosemary antioxidant extract was more effective than BHA/BHT (1:1) at both levels in protecting the products from oxidation.

TABLE 7

| ANTIOXIDANT IN CANOLA OIL AND MARGARINE | | |
|---|---|---|
| | PEROXIDE VALUES (meq/kg) | |
| ANTIOXIDANT | CANOLA OIL | MARGARINE |
| R. officinalis (.03%) | 5.2 | .6 |
| BHA/BHT (1:1) (.03%) | 8.8 | .8 |
| R. officinalis (.10%) | 5.8 | .9 |
| BHA/BHT (1:1) (.10%) | 9.0 | 1.2 |
| Control | 10.8 | 3.1 |
| Pretreatment | .6 | .4 |

EXAMPLE 8

Figure 3:
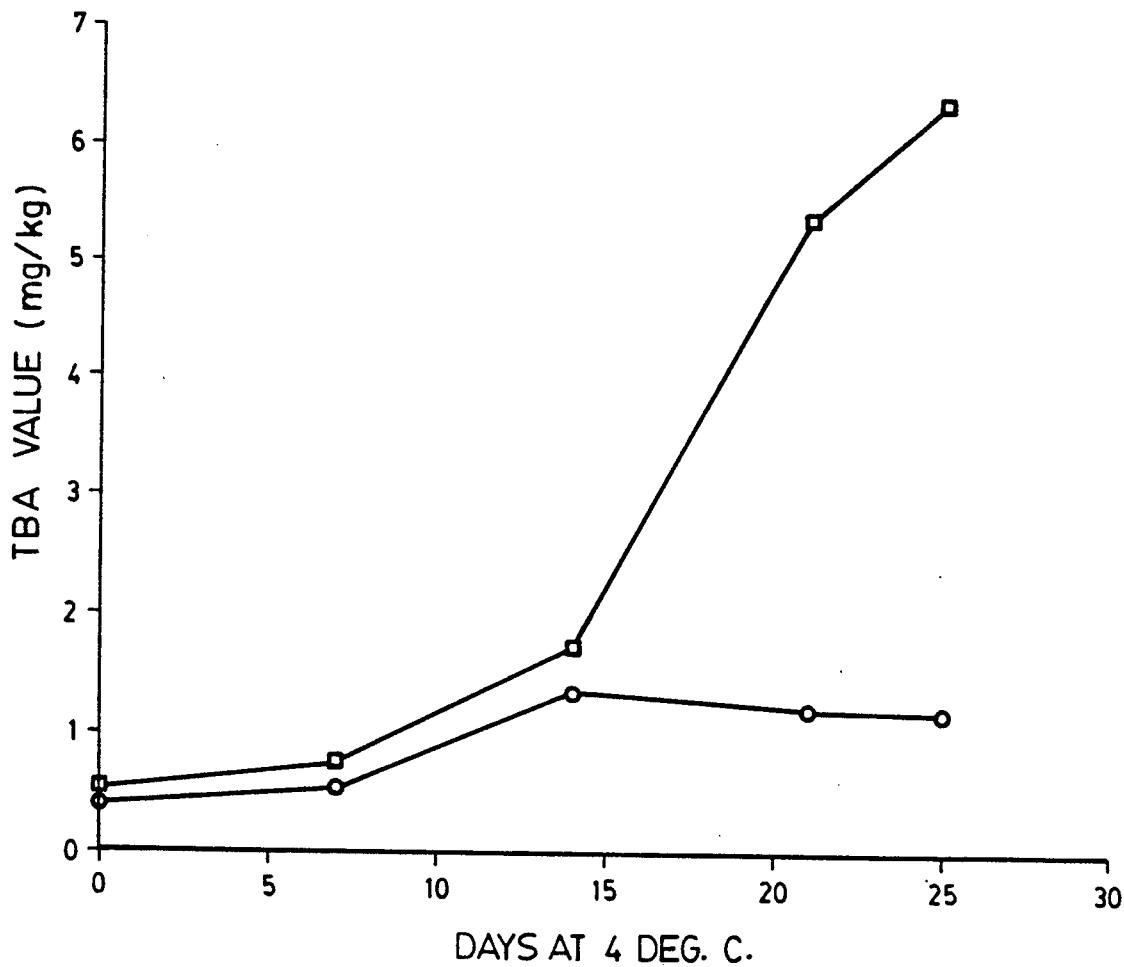
FIG. 3 shows the antioxidant power of an extract obtained by the invention added to the binder for chicken cutlets vs chicken cutlets with standard binder.

Forty grams of Sage (*S. officinalis*), antioxidant extract produced by the method of Example 3 plus 15 grams of rosemary antioxidant extract produced by the method of Example 3 were dispersed in 100 grams of refined Canola oil which had been heated to a temperature of 85° C. to facilitate solubility of the antioxidant extract. The oil solution was then added to a commercial seasoned meat binder (UFL Foods Product No. EE820) used in the production of cooked-then-frozen chicken cutlets. Two batches of cutlets were manufactured each utilising 550 kg of mechanically deboned chicken with a fat content of 20%. One batch contained the standard binder (Control) and the other batch (Treatment) contained the standard binder to which the antioxidant oil solution had been added by plating it onto the salt component of the binder. Thus, the rosemary/sage antioxidant extract was added to the product at the rate of 0.01% of meat or 0.05% of fat. The resulting pre-cooked cutlets were packaged in airtight wrap and stored at 4° C. Two random samples were taken from each batch on a weekly basis and duplicate measurements made of oxidative rancidity on each sample by means of the TBA method of Kakuda et al, JAOCS July:773 (1981). Results are shown in FIG. 3. By Day 14 the mean difference in TBA values between the two groups was significant at the 5% level and at the 1% level thereafter. After 4 weeks of storage the Treatment cutlets showed TBA values of less than 2 (acceptable) while the Control values were over 6 (unacceptable). Inclusion of the antioxidant fractions at 0.01% of meat yielded a shelf-life for these products sufficiently long to allow marketing in the fresh rather than frozen state.

EXAMPLE 9

Figure 4:
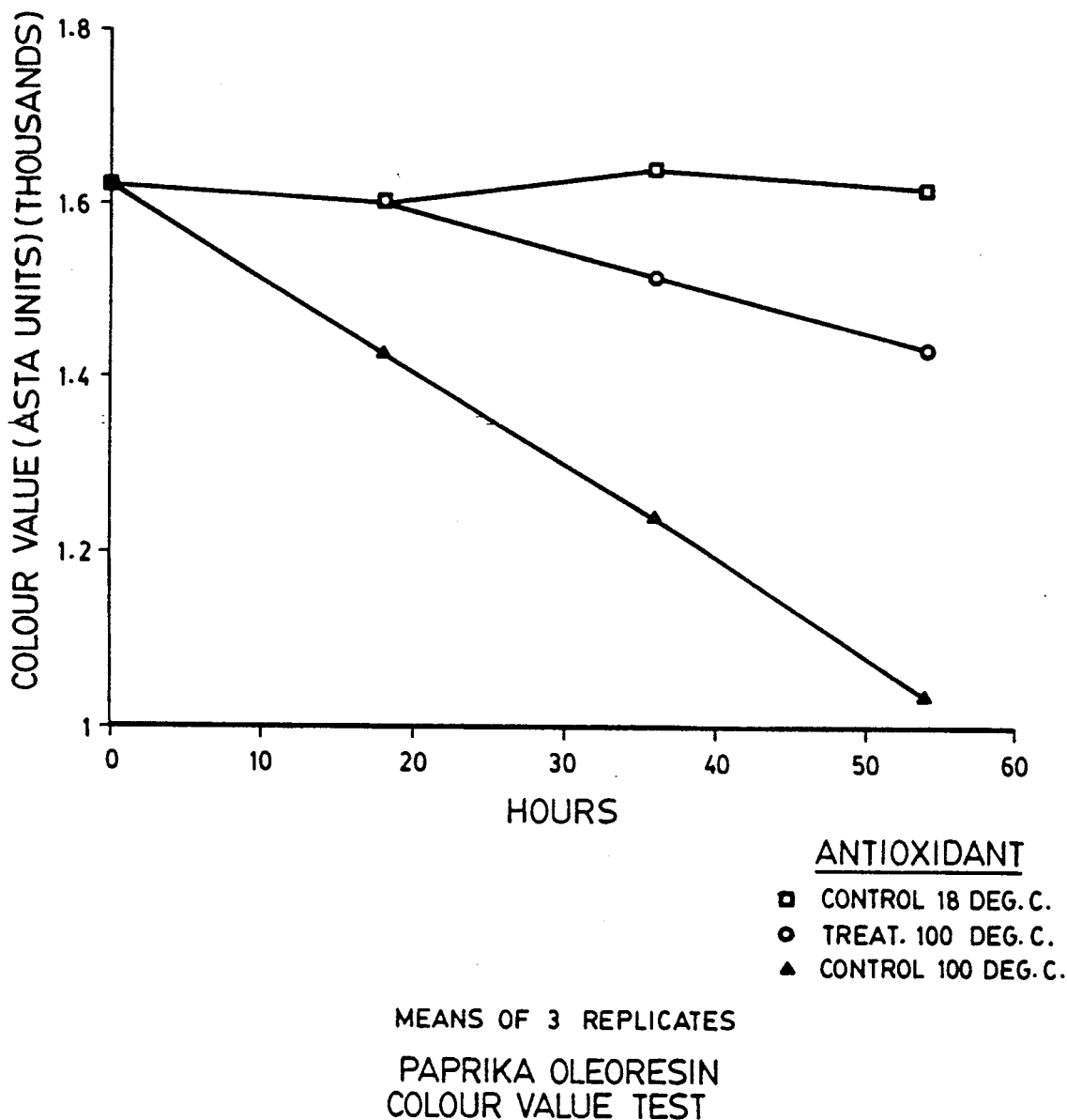
FIG. 4 shows the antioxidant power to protect colour loss of carotenoid pigments vs. untreated material.

Rosemary antioxidant extract produced by the method of Example 3 was dissolved in paprika oleoresin at the rate of 0.03% with stirring. Samples of the oleoresin with and without rosemary antioxidant extract were incubated at 100° C. for 54 hours in accordance with the method of Example 2. At 18 hour intervals the oleoresin samples were measured for colour value (ASTA Official Method 20.1) using a spectrophotometer. Results are shown in FIG. 4 which demonstrates the effectiveness of the rosemary antioxidant fraction in protecting against oxidative colour loss of the carotenoid pigments. After 18 hours of accelerated storage there was no colour loss in the treated oleoresin but a 12% loss in the untreated.

We claim:

1. A process for extracting antioxidants from the Labiatae family of domestic herbs, comprising:
   grinding the dried leaves of the herbs into a fine powder;
   extracting the powdered leaves with supercritical fluid carbon dioxide under conditions effective to extract antioxidant from the leaves, said conditions comprising a pressure of from about 350 bar to about 1000 bar, a temperature of from about 31° C. to about 120° C., and a fluid density of from about 0.6 kg/l to about 1.0 kg/l; and
   precipitating the antioxidant from the supercritical fluid under conditions effective to precipitate antioxidant from the fluid, said conditions comprising a first precipitation under a pressure of from about 100 bar to about 150 bar, at a temperature of from about 40° C. to about 100° C., and a fluid density of from about 0.2 kg/l to about 0.4 kg/l.

2. A process as claimed in claim 1, wherein the leaves are ground at a temperature not exceeding $-20°$ C.

3. A process as claimed in claim 1, wherein the powdered leaves are extracted with supercritical fluid carbon dioxide at a pressure of from about 500 bar to about 1000 bar, a temperature of from about 90° C. to about 110° C., and with a fluid density of from about 0.8 kg/l to about 1.0 kg/l.

4. A process as claimed in claim 1, wherein the antioxidant is precipitated from the supercritical fluid under a pressure of from about 110 bar to about 125 bar, a temperature of from about 65° C. to about 85° C., and with a fluid density of from about 0.25 kg/l to about 0.35 kg/l.

5. A process as claimed in claim 1, further comprising precipitating the essential oils from the carbon dioxide in a second precipitation under the non-supercritical conditions of pressure in the range of from about 20 bar to about 50 bar, and temperature of from about $-10°$ C. to about 25° C. wherein the gas density is less than 0.15 kg/l.

6. A process as claimed in claim 5, wherein about 70% to about 75% of the extract dissolved in the supercritical fluid carbon dioxide is precipitated in the first precipitation with the balance of material being precipitated in the second precipitation.

7. A process as claimed in claim 1, wherein the herbs are rosemary or sage or both.

8. A process as claimed in claim 1, wherein the herbs are any of rosemary, sage, oregano or thyme.

* * * * *